No. 719,421. PATENTED FEB. 3, 1903.
B. C. BATCHELLER.
PNEUMATIC DESPATCH TUBE APPARATUS.
APPLICATION FILED JUNE 14, 1900.
NO MODEL. 4 SHEETS—SHEET 3.

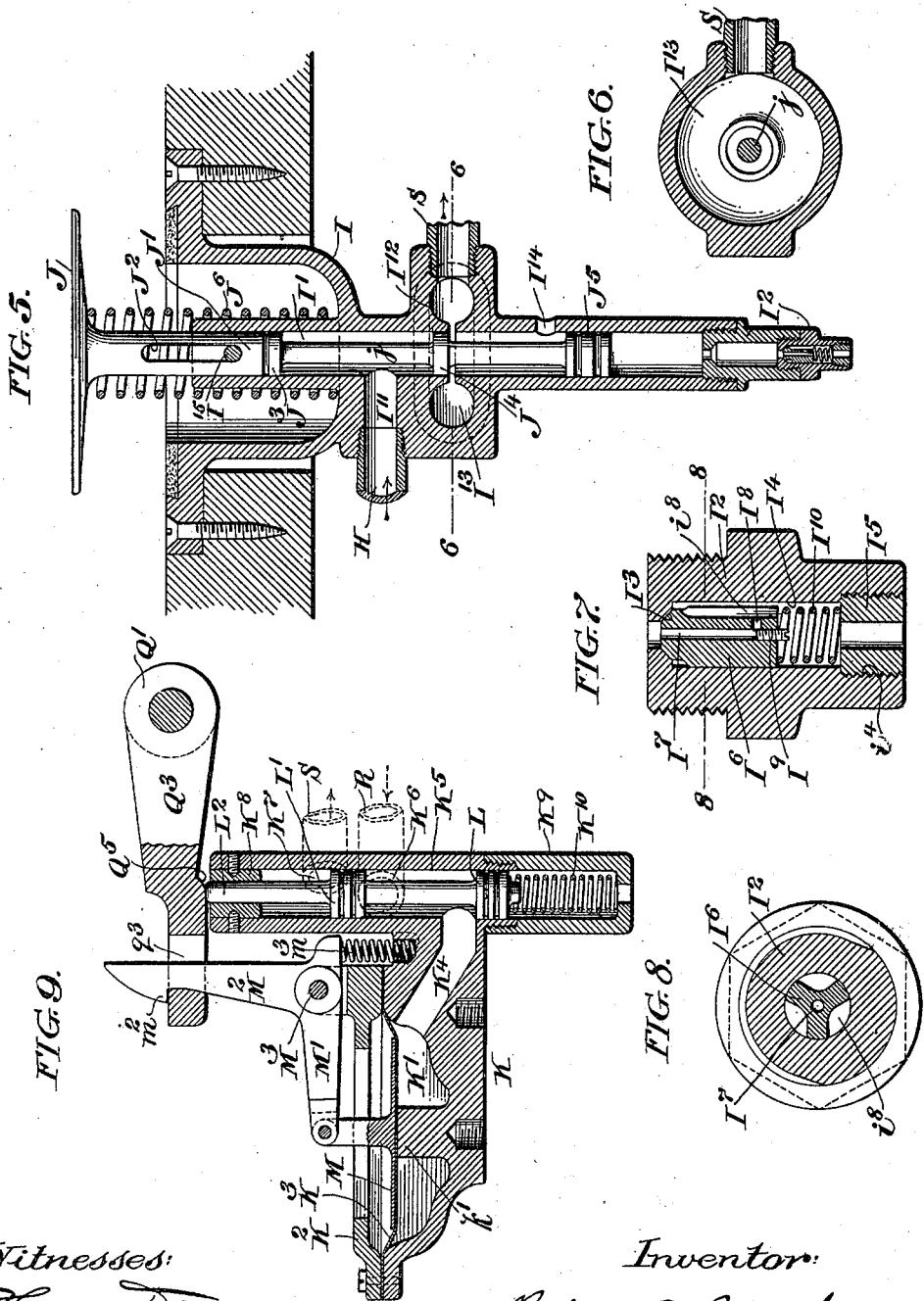

UNITED STATES PATENT OFFICE.

BIRNEY C. BATCHELLER, OF PHILADELPHIA, PENNSYLVANIA.

PNEUMATIC-DESPATCH-TUBE APPARATUS.

SPECIFICATION forming part of Letters Patent No. 719,421, dated February 3, 1903.

Application filed June 14, 1900. Serial No. 20,220. (No model.)

*To all whom it may concern:*

Be it known that I, BIRNEY C. BATCHELLER, a citizen of the United States of America, residing in the city and county of Philadelphia, in the State of Pennsylvania, have invented a certain new and useful Improvement in Pneumatic - Despatch - Tube Apparatus, of which the following is a true and exact description, reference being had to the accompanying drawings, which form a part thereof.

My invention relates to a pneumatic-tube system, and has for its object to provide a simple and efficient pneumatic-tube connection whereby two stations are connected to a single tube adapted to be used in both directions with great simplicity and ease of operation and with great economy in the use of the impelling fluid.

The nature of my improvements will be best understood as described in connection with the drawings, in which they are illustrated, and in which—

Figure 1:
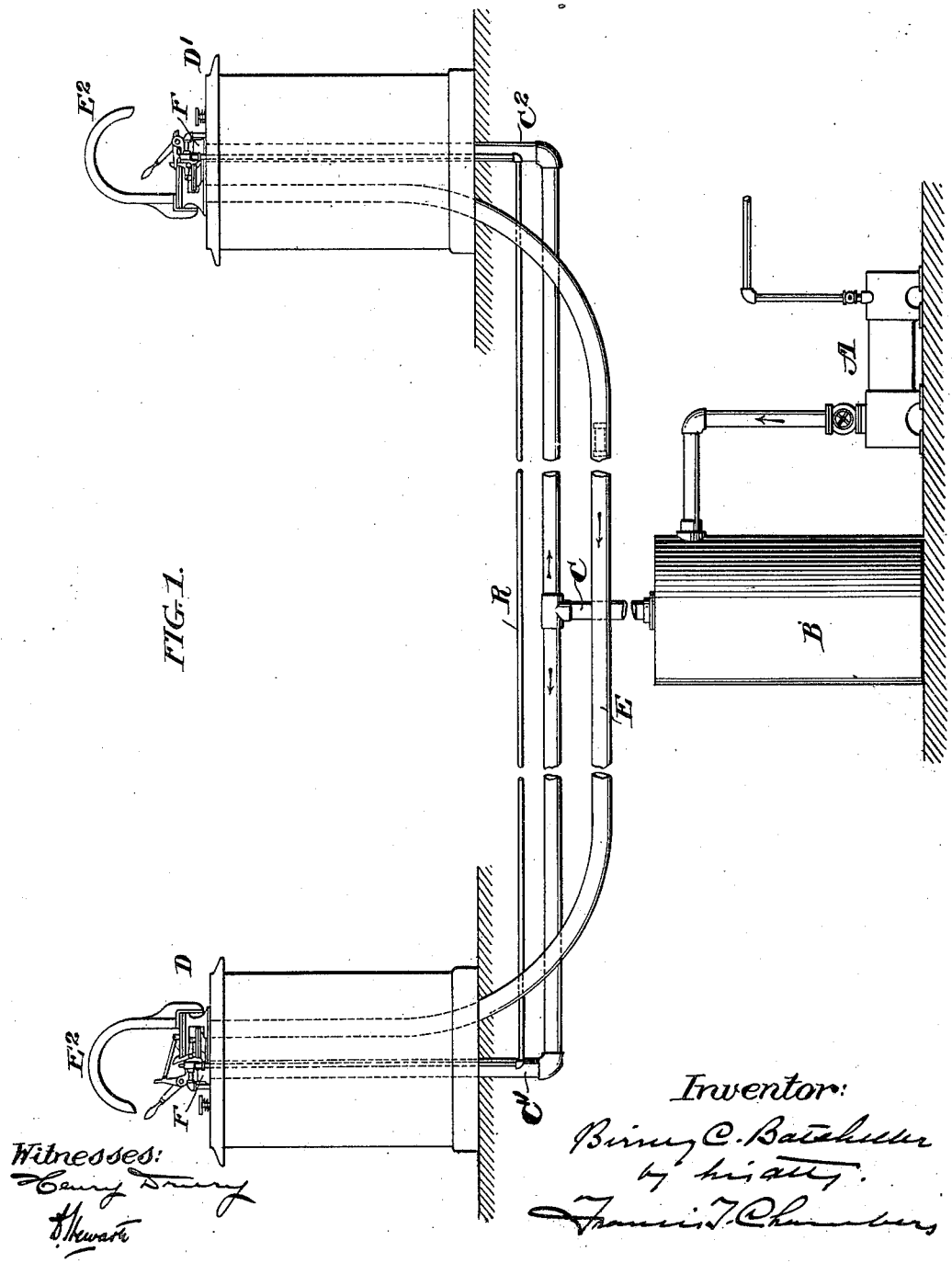
Figure 2:
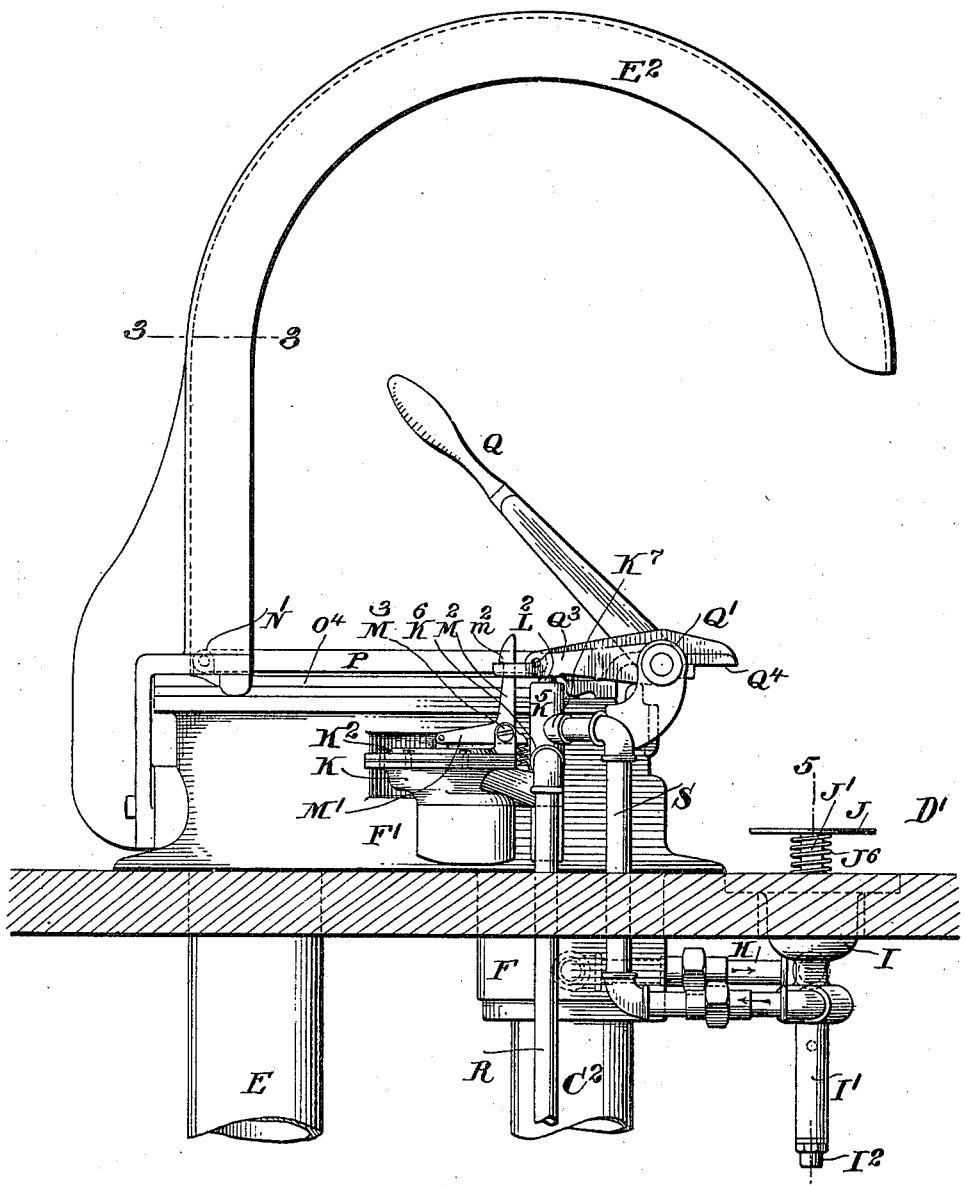
Figure 3:
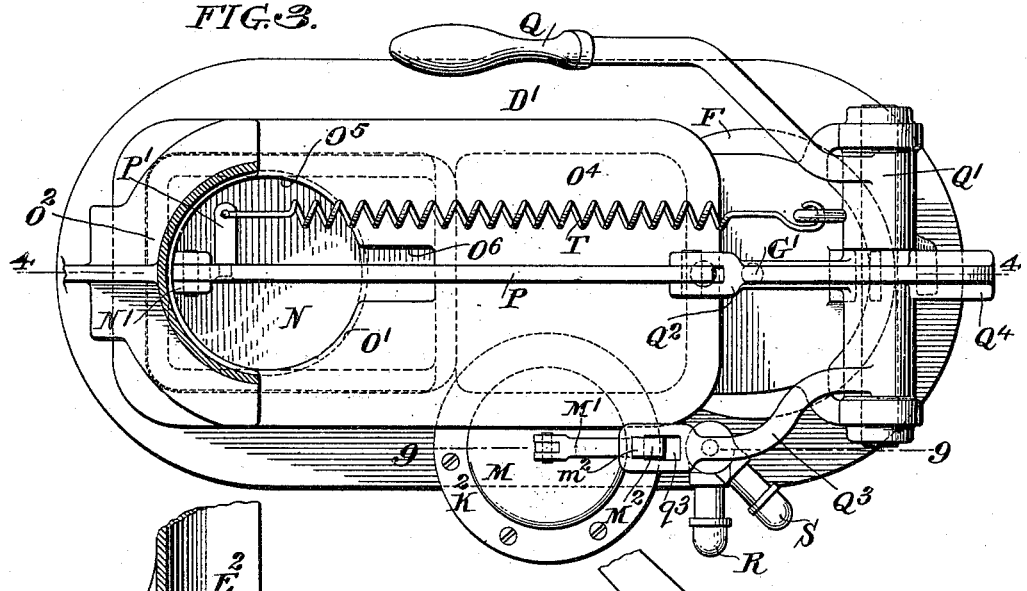
Figure 4:
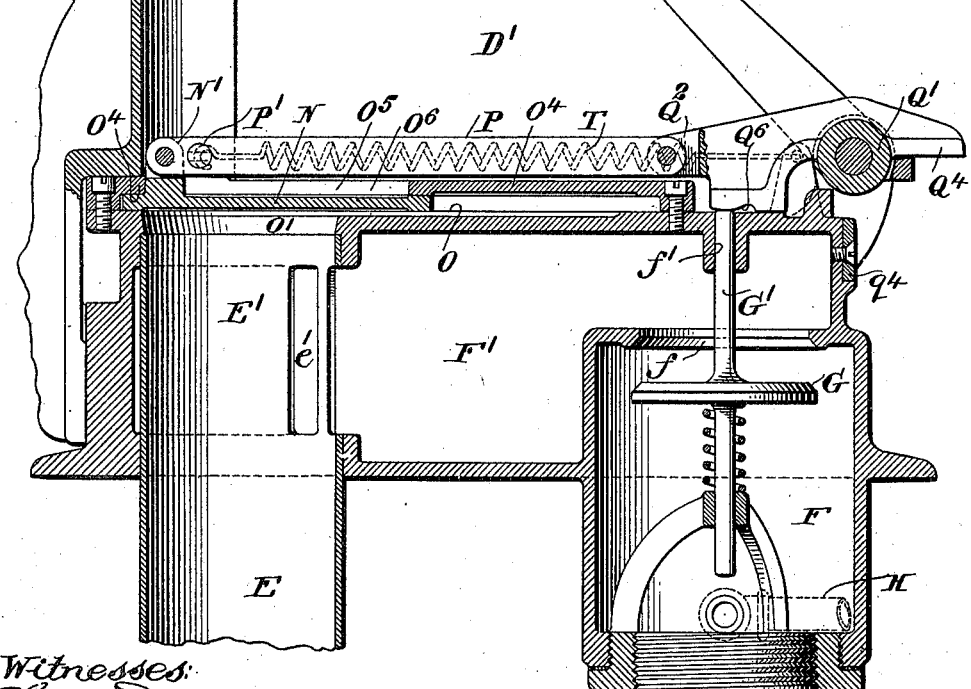

Figure 1 is a diagrammatic elevation showing the system connecting two stations in what I believe to be its most convenient form. Fig. 2 is a side elevation of the station apparatus. Fig. 3 is a plan view of the same apparatus; Fig. 4, a cross-sectional view on the line 4 4 of Fig. 3; Fig. 5, a cross-sectional elevation taken as on the line 5 5 of Fig. 2, but on an enlarged scale; Fig. 6, a cross-section on the line 6 6 of Fig. 5. Fig. 7 is an enlarged view of the device shown at the bottom of Fig. 5. Fig. 8 is a cross-section on the line 8 8 of Fig. 7, and Fig. 9 is a cross-section on the line 9 9 of Fig. 3.

A, Fig. 1, indicates an air-pump; B, a reservoir for compressed air; C, an outlet-pipe for compressed air connecting through branches C' and C² with the two stations on the line indicated at D and D'.

E is the pneumatic tube, connecting the two stations, said tube, as shown, having its terminal end E' formed with openings or perforations $e'$, as best shown in Fig. 4.

E² E² indicate the curved receivers, forming a continuance of the pneumatic tube at each station and whereby the carrier after leaving the tube has its momentum checked and its direction changed.

F F are compressed-air chambers secured to and in free communication with the ends of the branch tubes C' and C². These chambers are in communication through a valve-seated opening $f$ with conduits or boxes F', which also communicate with the ends E' of the pneumatic conduit through the opening $e'$. The valve-seated opening $f$ is normally closed by a spring-seated valve G, (see Fig. 4,) which has a projecting rod G' extending through a box $f'$ in the top of the air box or conduit F'.

H is a conduit leading from the air-reservoir F to a port $I^{11}$, leading into the cylindrical valve-chamber I'. (See Fig. 5.) This valve-chamber, as shown, is supported on a cup-shaped bracket I, secured to the table at the station, and has its lower end closed by a plug $I^2$. (Best shown in Fig. 7.) This plug is perforated, having a valve-seated opening $I^3$ at its top communicating with a larger cylindrical opening $I^4$, having at its lower end a threaded extension $i^4$, of larger diameter, into which screws the perforated plug $I^5$.

$I^6$ is a valve working in the cylindrical opening $I^4$ and normally held to the seat $I^2$ by a spring $I^{10}$. The plug-valve $I^6$ is formed with a central perforation $I^7$, threaded at its lower end and communicating by a lateral perforation $I^8$ with a slot $i^8$, leading below the bottom of the plug-valve. The bottom of the perforation $I^7$ is closed and the escape of air through the lateral perforation $I^8$ regulated by means of an adjusting-screw $I^9$.

$I^{11}$, as already mentioned, is a port through which the conduit H communicates with the valve-chamber I'.

$I^{12}$ is an annular port leading from the valve-chamber I' to an annular chamber $I^{13}$, communicating in turn with a conduit S.

$I^{14}$ is an air-escape passage leading through the wall of the chamber I'.

$I^{15}$ is a pin passing through the upper end of the valve-chamber I'.

J (see Figs. 2 and 5) is a table secured to the upper end of standard J', extending into the upper end of the cylindrical valve-chamber I' and formed with a slot $J^2$, through which passes the pin $I^{15}$, permitting the standard and table supported upon it to move for the length of the slot $J^2$, the standard and table being normally held in their uppermost position by the action of a spring $J^6$ and the table being situated immediately below the end of the curved receiver E², so that the carrier coming from the pneumatic transit-tube will fall upon and depress the table J and the parts connected therewith. Secured to or formed with the standard J' is the valve-rod $j$, to which are attached the three piston-valves $J^3$, $J^4$, and $J^5$, the normal position of these valves being, as shown in Fig. 6, one in which the valve $J^4$ cuts off communication between the pipe H and the pipe S and leaves a free opening from the pipe S to the exhaust-opening $I^{14}$. The depression of the table J, however, presses the valve $I^4$ down below the port $I^{12}$, placing the pipes H and S in communication and cutting off the exhaust-opening $I^{14}$ from communication with the pipe S. The downward movement of the valve $J^5$, compressing the air in the lower part of the valve-chamber I', causes the plug-valve $I^6$ to open and permits the free escape of air through the plug $I^2$. As soon, however, as the weight depressing the table J is removed the spring $J^6$ in moving the table and its attached valves back to normal position is opposed by the vacuum in the lower part of the valve-chamber I', and the return of the parts to normal position is therefore regulated by the adjustment of the screw $I^9$, regulating the flow of air through the ports $I^8$ and $I^6$ into the lower part of the valve-chamber.

K, Figs. 2, 3, and 9, is a casting secured to the table at each station and having formed in its upper part a chamber K', open at top and preferably provided with a flat-topped central projection $k'$.

$K^2$ is an annular ring adapted to be bolted to the peripheral flange of the chamber K' and between which and said flange is secured a flexible diaphragm $K^3$.

$K^4$ is a port leading from the chamber K' to a cylindrical valve-chamber $K^5$, formed in the same casing and through the walls of which extend ports, (indicated at $K^6$ and $K^7$.) At the upper end of the valve-chamber $K^5$ is a perforated guide-plug $K^8$ and at the lower end is a spring-supported cup $K^9$, screwing onto the lower end of the valve-chamber and supporting a spring $K^{10}$.

L and L' are piston-valves working in the valve-chamber $K^5$ and secured to a valve-spindle $L^2$, the upper end of which projects through the perforated plug $K^8$ and above the top of the valve-chamber.

M is a circular plate resting in contact with the diaphragm $K^3$ and connected by a central arm with the arm M' of a bell-crank lever M' $M^2$, pivoted at $M^3$ and normally held in the position indicated in Fig. 9 by the action of a spring $m^3$. The arm $M^2$ of the bell-crank lever is formed with a latching end, as indicated at $m^2$.

N (see Figs. 3 and 4) is a sliding gate moving in ways O, formed on the top of the air-box F' and beneath a top plate $O^4$, having an opening $O^5$, which communicates with the opening O', formed in the end of the ways and as a continuation of the end E' of the pneumatic conduit. The gate N has an upwardly-projecting lug N', by which it is pivotally connected with a rod P, said rod having a laterally-projecting pin P' and being pivotally connected at its other end with a lever-arm $Q^2$, connected to a pivoted hub Q', said hub having also attached to it an operating-lever Q and a lever-arm $Q^3$, having a perforated end, as indicated at $q^3$, Fig. 9, adapted to engage with a latch $m^2$ on the bell-crank-lever arm $M^2$ and also having a portion $Q^5$, adapted when depressed to press against the valve-spindle $L^2$.

$Q^4$, Figs. 3 and 4, is a stop projection secured to the hub Q' and adapted when the lever Q is raised to come in contact with the stop indicated at $q^4$, Fig. 4.

R is an air-pipe connecting the valve-chamber $K^5$, as indicated in Fig. 1.

S is an air-conduit leading from the valve-chamber $K^5$ to the annular port $I^{13}$, in communication with the valve-chamber I'.

T is a spring connected with the pin P' and acting to draw the connecting-rod P and the gate N, attached thereto, backward, so as to open the end of the pneumatic conduit.

The normal position of the apparatus in both stations is that in which the gates N are both opened and the valve G seated, closing the communication between the air-chambers F and the conduit or box F'. In this position the valves $J^3$, $J^4$, and $J^5$ are in the position shown in Fig. 5 and the valves L and L' are in their uppermost position, in which they place the two conduits S and R in communication and cut off communication between the conduit R and chamber K'. It being desired to send a carrier from one station to the other, the carrier is inserted in the open end E' of the pneumatic conduit, and the operator then moves the lever Q to the position shown at the station D' in Fig. 1 and in Figs. 2, 3, and 4. This movement of the lever acting through the lever-arm $Q^2$ and connecting-rod P closes the gate N in station D', and the projecting toe indicated at $Q^6$ is forced down against the valve-spindle G', forcing the valve G downward to the position shown in Fig. 4 and opening communication from the air-chamber F through the box F' and perforation $e'$ into the end E' of the pneumatic tube. The same movement of the lever Q also forces down the lever-arm $Q^3$, causing its end to engage with the bell-crank-lever arm $M^2$, as indicated in Fig. 9, and through its toe $Q^5$ pressing down the valves L and L', so as to cut off communication between the pipes S and R and place the pipe R in communication with the chamber K'. The said chamber K' in station D' is therefore in free communication through pipe R and the valve-chamber $K^5$ in station D with the pipe S and through it and the chamber $I^{13}$ and the valve-chamber I' with the exhaust-opening $I^{14}$ in station D. The air being admitted to the pneumatic conduit in station D', as already described, the carrier is rapidly impelled through the conduit and through the open gate in station D into the curved receiver E², and thence falls upon the table J, depressing it and the valves moving with it, so as to place it and conduit S in communication with pipe H and through pipe H with the air-reservoir F in station D. The air from this reservoir then flows freely through the pipe H, valve-chamber I', conduit S, and valve-chamber I⁵, all in station D, into the connecting-pipe R, and thence back to station D', where, passing into the valve-chamber K⁵ and the valves being arranged as shown in Fig. 9, the air enters through port K⁴ the chamber K' and acting on the diaphragm K³ presses upward the plate M and the lever-arm M', attached thereto, moving the latch-arm M² of the lever backward, so as to disengage it from the various springs Q³, whereupon the action of the various springs tending to restore the parts to normal operation causes the gate N to open and the lever Q and the parts attached thereto to move back to normal position, (that shown at station D in Fig. 1,) whereupon the valve G in station D' closes, cutting off further supply of air to the pneumatic transit-pipe, and the valves L and L', moved upward to their normal position, placing the pipes R and S in communication and permitting the exhaust of air from pipe S through valve-chamber I' and exhaust-port I¹⁴, as shown in Fig. 5. It will readily be understood that the time during which the valves J³ J⁴ J⁵ in the receiving-station D will remain depressed will depend upon the regulation of the air-entrance through the plug I², as already described, and that as soon as the valves mentioned return to normal position, as shown in Fig. 5, the pipe S will be connected with the exhaust at both ends and entirely disconnected with pipe H and the air-reservoirs F F.

Having now described my invention, what I claim as new, and desire to secure by Letters Patent, is—

1. In a pneumatic-despatch-tube system, a despatch-tube connecting two stations in combination with a compressed-air conduit or conduits connected to each end of said tube, a normally closed valve in the connection between each tube end and the compressed-air conduit, a gate for closing each end of the tube at will, valve-actuating mechanism whereby the closing of each gate opens the valve admitting compressed air to the closed end of the tube and the opening of the gate causes said valve to close, a latch arranged at each end of the tube to hold the gate closed and gate-retracting mechanism tending to open it, a pneumatic unlatching device at each end of the tube, a pneumatic conduit leading from each station to the unlatching device in the other station, a connection in each station between said pneumatic conduit and the compressed-air conduit, a valve normally closing said connection and means actuated by a carrier arriving at said station for opening said valve and thereby unlatching the gate and shutting off the air-supply in the other station.

2. In a pneumatic-despatch-tube system, a despatch-tube connecting two stations in combination with a compressed-air conduit or conduits connected to each end of said tube, a normally closed valve in the connection between each tube end and the compressed-air conduit, a gate for closing each end of the tube at will, valve-actuating mechanism whereby the closing of each gate opens the valve admitting compressed air to the closed end of the tube and the opening of the gate causes said valve to close, a latch arranged at each end of the tube to hold the gate closed and gate-retracting mechanism tending to open it, a pneumatic unlatching device at each end of the tube, a pneumatic conduit leading from each station to the unlatching device in the other station, a connection in each station between said pneumatic conduit and the compressed-air conduit, a valve normally closing said connection, means actuated by a carrier arriving at said station for opening said valve and thereby unlatching the gate and shutting off the air-supply in the other station, means for automatically closing the air-valve and shutting off the air-supply to the pneumatic conduit said means also acting to open an exhaust-passage from said conduit.

3. In a pneumatic-despatch-tube system, a despatch-tube, as E, connecting two stations in combination with compressed-air chambers, as F F, at each station connected with the ends of the tubes as by conduits F', a valve, as G, normally closing the passage between chamber F and conduit F', a slide-gate, as N, arranged to close each end of the tube E, a lever, as Q Q², arranged to operate the sliding gate through a connecting-rod P and a finger, as Q⁶, moving with the lever and arranged to act on valve G only when the sliding gate is closed.

4. In a pneumatic-despatch-tube system, a despatch-tube, as E, connecting two stations in combination with compressed-air chambers, as F F, at each station connected with the ends of the tubes as by conduits F', a valve, as G, normally closing the passage between chamber F and conduit F', a gate, as N, arranged to close each end of the tube E, means for opening and closing the gate and for also opening and permitting the closing of valve G, said means being arranged to act on said valve only when the gate is closed or substantially closed whereby the loss of compressed air is avoided, a latch arranged to engage and hold each gate in closed position, a pneumatic latch-releasing device for each latch, a pneumatic conduit, as R, connecting the two stations, a connection from said conduit to the latch-releasing device, a valve normally closing said connections, means for opening said valve operated by the gate-closing device in closing its gate, a connection between the conduit R and each chamber F, a normally closed valve in said connection and a device operated by the carrier in passing out of the tube for temporarily opening said valve.

5. In a pneumatic-despatch-tube system having two stations connected by a tube E and a conduit R, with gates for closing the end of the tube, latches for holding said gate closed and pneumatic unlatching devices connected with conduit R, as described, a valve-casing, as I', connected to a source of air-supply and to tube R, and having also an exhaust-opening, a valve, as $J^3 J^4 J^5$, normally closing the connection through the casing between the conduit R and the air-supply and opening the connection from conduit R to the exhaust, and means actuated by a carrier passing out of the tube for moving said valve to connect the conduit R with the air-supply and cut off the exhaust.

6. In a pneumatic-despatch-tube system having two stations connected by a tube E and a conduit R, with gates for closing the ends of the tube, latches for holding said gates closed and pneumatic unlatching devices connected with conduit R, as described, a valve-casing, as I', connected to a source of air-supply and to tube R, and having also an exhaust-opening, a valve, as $J^3 J^4 J^5$, normally closing the connection through the casing between the conduit R and the air-supply and opening the connection from conduit R to the exhaust, means actuated by a carrier passing out of the tube for moving said valve to connect the conduit R with the air-supply and cut off the exhaust, and means for retarding without stopping the return of said valve to its normal position.

BIRNEY C. BATCHELLER.

Witnesses:
R. WESTACOTT,
ALFRED NUTTING.